United States Patent [19]

Shames et al.

[11] Patent Number: 4,562,859
[45] Date of Patent: Jan. 7, 1986

[54] BALLCOCK ASSEMBLY

[76] Inventors: Sidney J. Shames, 57 Holly Pl., Briarcliff Manor, N.Y. 10510; Harold Shames, 5 Agnes Cir., Ardsley, N.Y. 10502

[21] Appl. No.: 688,730

[22] Filed: Jan. 4, 1985

[51] Int. Cl.[4] ...................... F16K 31/34; F16K 33/00
[52] U.S. Cl. .................................. 137/414; 137/430; 137/437; 138/37; 251/127
[58] Field of Search ............... 137/413, 414, 436, 437, 137/430, 432, 433; 138/37, 39; 251/118, 127

[56] References Cited

U.S. PATENT DOCUMENTS

| | | | |
|---|---|---|---|
| 1,566,862 | 12/1925 | Halterman | 138/37 |
| 1,877,567 | 9/1932 | Erbes | 138/37 |
| 2,808,850 | 10/1957 | Doyle | 137/414 |
| 2,911,000 | 11/1959 | Doyle | 137/414 |
| 3,194,258 | 7/1965 | Grant | 137/414 |
| 3,495,803 | 2/1970 | Schoepe et al. | 137/414 |
| 3,576,199 | 4/1971 | Schoepe et al. | 137/437 |
| 3,955,835 | 5/1976 | Farrington | 138/37 |
| 4,466,741 | 8/1984 | Kojima | 138/39 |

Primary Examiner—George L. Walton
Attorney, Agent, or Firm—Norman Lettvin

[57] ABSTRACT

A ballcock is constructed with upper and lower housing members which are joined by a bayonet-type fitting. The juncture of the upper and lower members defines a valve chamber which sits atop the orifice of a vertical inflow tube carrying water from below the lower housing member. A valve in the valve chamber controls the flow of water out of the orifice. The valve includes separate, spaced upper and lower resilient valving members that provide a pressure chamber. Pressure in the chamber is controlled by a spherical-head metering pin passing through apertures in the upper and lower members. A slip-on silencer telescopes over the orifice and defines, with the exterior of the inflow tube, a quieting passage. The quieting passage has an annular intake at the top and terminates below in a pair of downward directed nozzles. The spherical-head metering pin makes a ball-and-socket connection with a lever. The lever is resiliently connected to the upper housing member and operated by a metal rod connected to a float.

12 Claims, 17 Drawing Figures

U.S. Patent   Jan. 7, 1986   Sheet 2 of 4   4,562,859
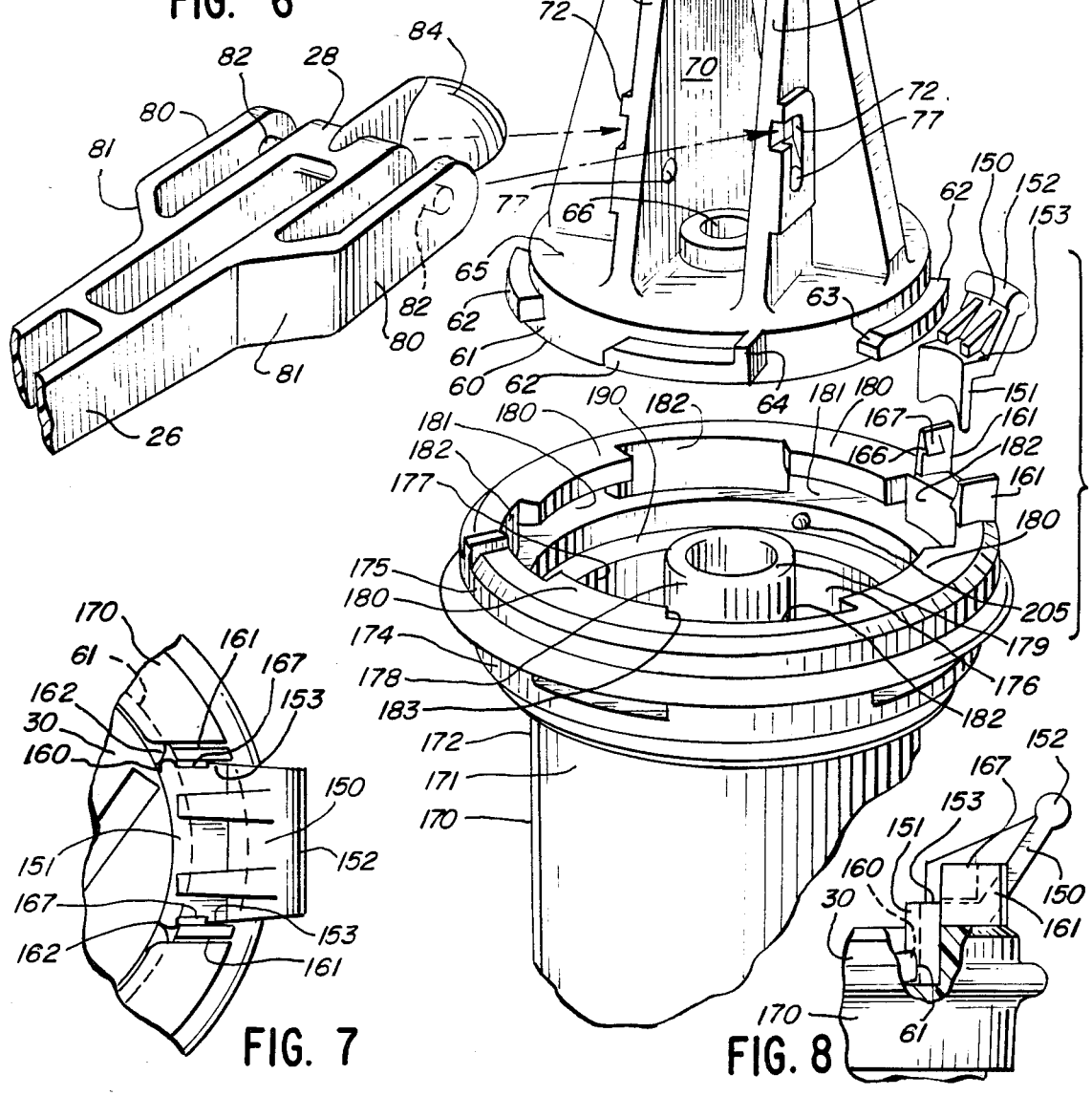
FIG. 5
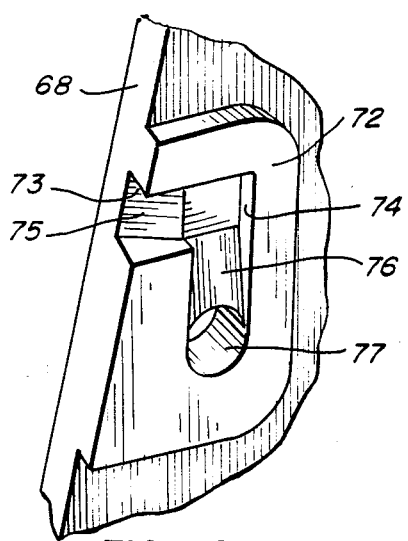
FIG. 6
FIG. 7
FIG. 8

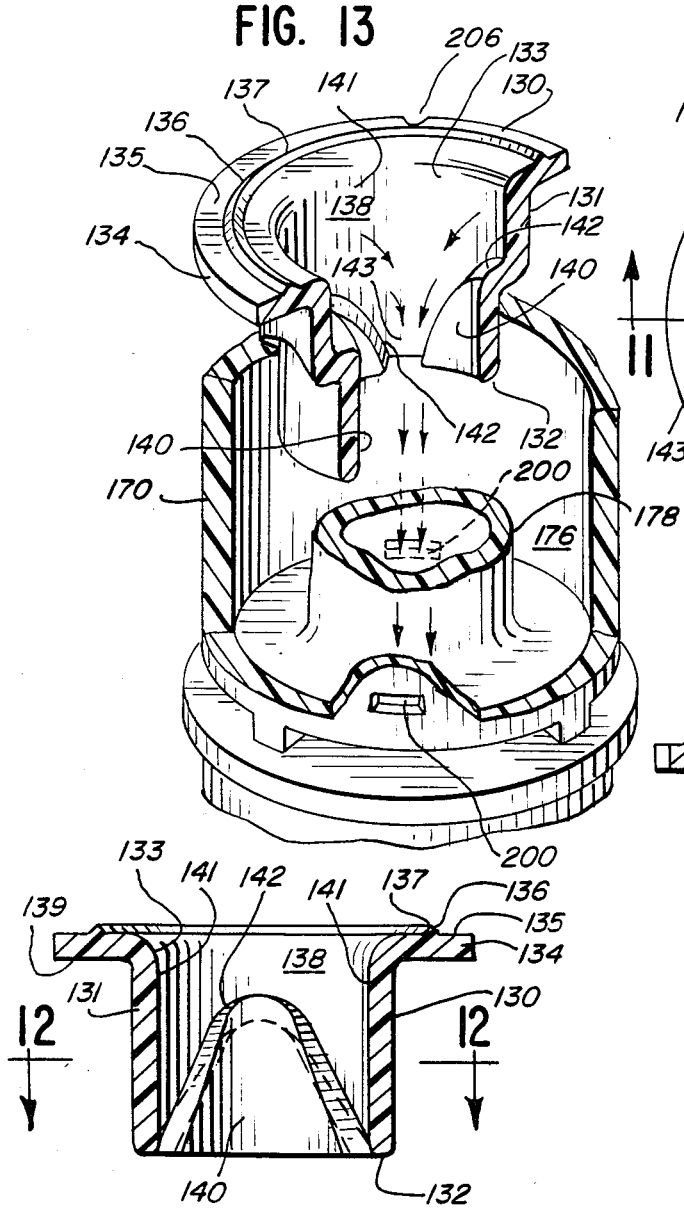
FIG. 13
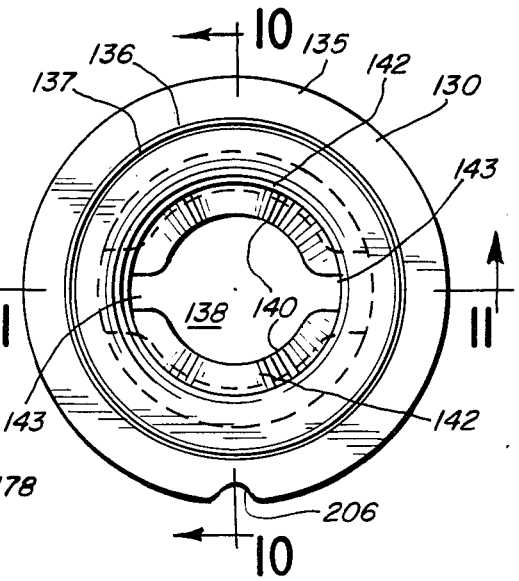
FIG. 9
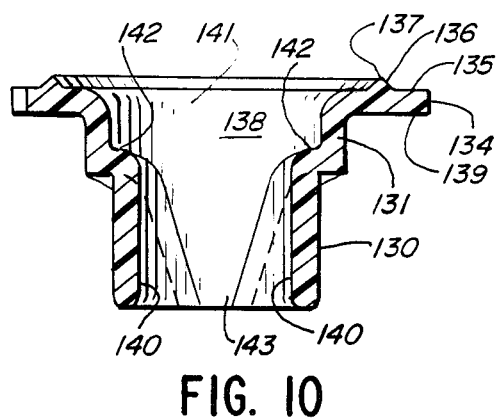
FIG. 10
FIG. 11
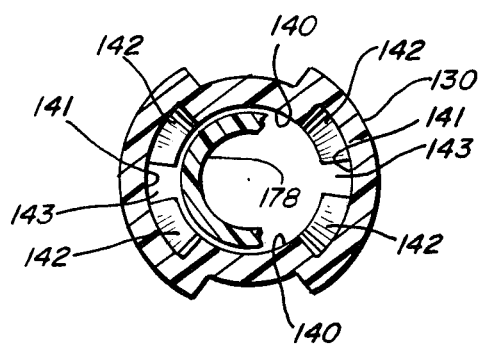
FIG. 12

U.S. Patent  Jan. 7, 1986  Sheet 4 of 4  4,562,859
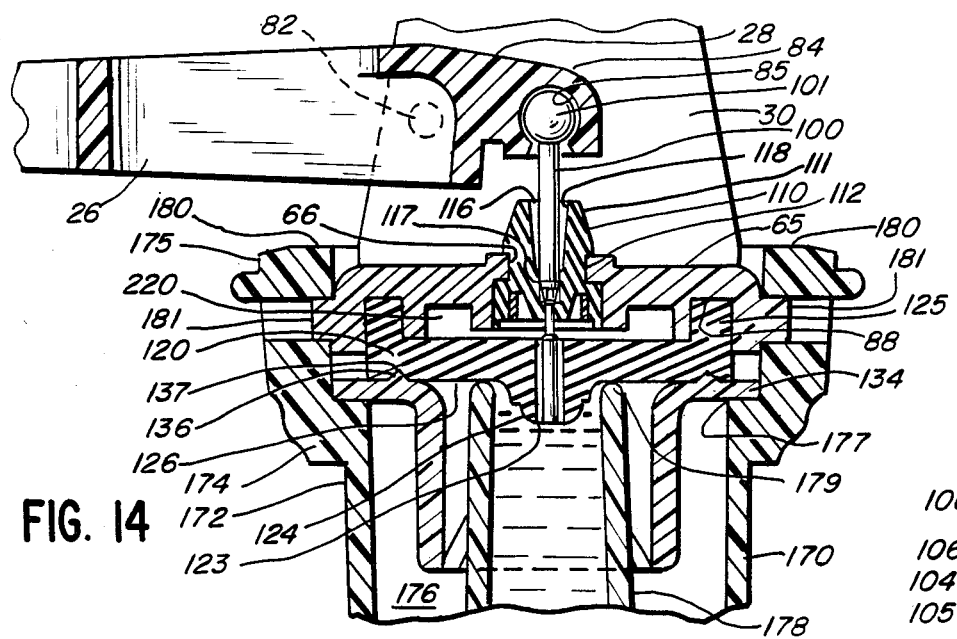
FIG. 14
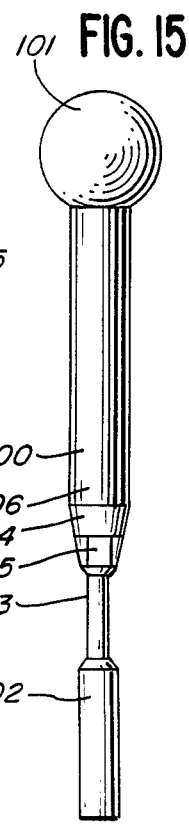
FIG. 15
FIG. 16
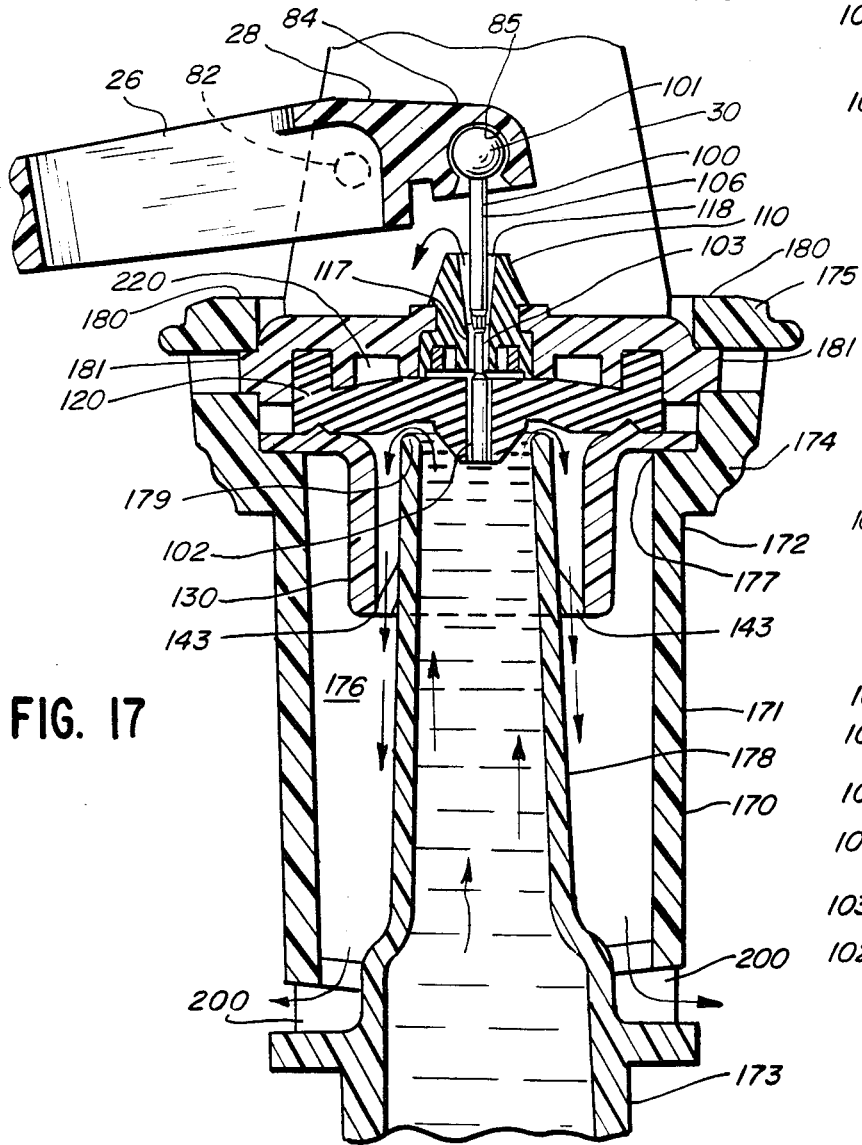
FIG. 17

BALLCOCK ASSEMBLY

This invention relates generally to an apparatus for controlling the water level in a toilet flush tank. More particularly this invention relates to improvements in a submerged, silenced, pilot controlled ballcock for use in a flush tank for a toilet.

BACKGROUND OF THE INVENTION

Ballcocks are well known devices used for controlling the water level in a tank such as the reservoir for a flush toilet. Ballcocks such as those disclosed in U.S. Pat. Nos. 2,808,850 and 2,911,000 issued to O. K. Doyle on Oct. 8, 1957, and Nov. 3, 1959, are known to make use of a float that moves in response to the level of water in the flush tank, while being guided telescopically by a guide mast.

U.S. Pat. No. 2,808,850 discloses use of a pilot controlled valve structure for a ballcock, positioned at the upper end of a water intake pipe located within a flush tank. The pilot controlled valve structure is housed in a two piece casing that includes a float-actuated lever pivotally mounted upon the upper, or cap, portion of the casing. The casing's cap is the uppermost casing part that connects, through a bayonet-type connection, to a lower, cup-shaped casing part. The control valve disclosed by the patent is located within the two-piece casing and includes a pair of nested, cup-shaped, flexible seal units, or valving members, with spaced horizontal, or transverse, wall portions that define and bound a pilot pressure chamber. The control valve also includes an elongated control pin, or pilot valve, that is operatively connected to the float actuated lever. The control pin is arranged to project through axially aligned openings in the spaced, transverse wall portions of the flexible seal units. The transverse wall portion of the lower nested seal unit serves as a diaphragm to control inflow of water to the flush tank in response to pressure changes in the pressure chamber.

The ballcock's valve in U.S. Pat. No. 2,808,850 is positioned at the top of the mast and is, accordingly, above the tank's water level part of the time. A submerged location adjacent the bottom of the flush tank is desirable for a ballcock valve, because the presence of water surrounding the valve at substantially all times aids to reduce the sound level of the incoming water.

U.S. Pat. No. 2,911,000 discloses another type of control valve that includes nested members. The lower member in said U.S. Pat. No. 2,911,000 is provided with an outer skirt to prevent water flow through air intake openings in the housing during the time the valve is open. When the valve is closed then the skirt falls away from the openings. Air then flows through the openings and thereby prevents siphoning.

The valve body may be formed of corrosion resistant plastic as disclosed in, for example, U.S. Pat. No. 3,194,258 issued to R. W. Grant on July 13, 1965.

U.S. Pat. No. 3,495,803 issued to A. Schoepe, et al. on Feb. 17, 1970, discloses a submerged ballcock valve for controlling the level of water in the flush tank of a toilet. The disclosed valve is of the pilot type having an axially movable pilot pin to control operation of the valve: A filtering and circuitous path noise reducing member is disclosed.

U.S. Pat. No. 3,576,199 issued to A. Schoepe, et al. on Apr. 27, 1971, discloses a ballcock valve having a submerged, reduced vertical height, unitary, molded lower housing member that provides an axial flow intake portion and an annular outlet flow portion. A removable fitting that provides filtering means is positioned in a filtering chamber defined in the path of the outlet flow in the lower housing member. The upper end of the lower housing member is adapted for the mounting of the upper housing member which carries a mast-like guide for a float.

SUMMARY OF THE INVENTION

One object of the preferred embodiment of this invention is to provide a pilot operated control valve that has upper and lower flexible seal units that are separated from each other with walls that, except for the diaphragm portions, are supported by relatively rigid, molded, casing elements. This feature avoids use of sealing members that require the nesting of two parts of resilient material. At the same time, this feature provides for simple and accurate assembly of two simple-shaped resilient units, with an elongated pilot control pin which is arranged to cooperate with the flow through the bores provided in the diaphragm portions of the two seal units to provide for pilot control of the valve.

Another object of this invention is to provide a submerged, pilot controlled, ballcock valve with improved silencing of noise that is normally caused by outflow of water from the ballcock. Silencing is effected by use of a shaped nozzle that receives incoming water under pressure and gently and gradually changes the direction of the incoming water flow to direct the flow into the outlet portion of the ballcock. Use of the shaped nozzle reduces noise by eliminating water turbulence and keeping the flow through the annular outflow chamber of the ballcock substantially laminar.

Another feature of this invention is the arrangement and provision of a support flange on the shaped silencing nozzle that serves as a seat for the main flow control diaphragm of the pilot controlled valving means of the ballcock valve.

Still another feature of this invention is the use of the base of the guide mast for the ballcock's float as an assembly means to insure proper assemblage of the resilient valving members in the assembled ballcock. The valving members comprise a pair of separate concentric members that are readily assembled on the base of the guide mast rather than by interfitting of the two resilient members within each other, thereby avoiding frictional interference and simplifying assembly of the ballcock valving means.

A further feature of this invention is the provision of novel mounting means for the ballcock's lever arm upon the float's guide mast. The lever arm's mounting assures that the axially movable control pin, that is part of the pilot controlled operation of the valve, is moved primarily axially relative to the aligned apertures provided in the two spaced, resilient, valving members of the pilot operated ballcock.

BRIEF DESCRIPTION OF THE DRAWINGS

The details of our invention are disclosed in the accompanying drawings wherein:

FIG. 5 is an enlarged, exploded, fragmentary, perspective view, illustrating details of the upper and lower housings for the valving portions of the ballcock shown in FIG. 1, with the pilot control pin and the resilient valving members of the pilot control, and the silencer, omitted from this view, but also showing in fragmentary perspective the end of the lever that operates the pilot control pin;

FIG. 6 is a fragmentary, enlarged, perspective view of a section of the upper housing member that is seen in FIG. 5, but showing in greater detail elements of the socket in the molded member that serves as part of the mounting for the lever that controls the position of the pilot control pin of the pilot control chamber of the control valve of the ballcock;

FIG. 7 is an enlarged, fragmentary, top plan view of that portion of the ballcock that is seen in FIG. 5 and which provides a locking member that serves to selectively lock the molded upper and lower body members of the ballcock in position that prevents rotation of the upper body member relative to the lower body member;

FIG. 8 is a fragmentary side elevational view of the selectively insertable locking member that is shown in top plan view in FIG. 7;

FIG. 9 is a top plan view of the silencer of this invention;

FIG. 10 is a cross-sectional view of the silencer part shown in FIG. 9 and is taken substantially on the section line 10—10 of FIG. 9.

FIG. 11 is another cross-sectional view of the silencer part of FIGS. 9 and 10, and is taken substantially on the section line 11—11 of FIG. 9, which lies orthogonal to the section line 10—10 seen in FIG. 9;

FIG. 12 is a fragmentary cross-sectional view of a downstream section of the silencer part, and is taken substantially on the section line 12—12 of FIG. 11;

FIG. 13 is a fragmentary perspective view of the silencer employed as part of the valve seen in FIG. 2, and illustrating with arrows how the incoming water flow is directed past the pilot valve and in a manner to secure silencing of water entering the flush tank;

FIG. 14 is an enlarged, fragmentary, cross-sectional view of the assembled pilot-controlled valve means, of the improved submerged ballcock shown in FIG. 1, taken substantially on line 14—14 of FIG. 1 and illustrating the control valve in its position when the pilot control pin of the valve is positioned to prevent intake flow of water through the submerged ballcock's valve, and with the control arm of the float-operated lever, for the valve's pilot controlling pin extending to the left, rather than to the right as seen in FIG. 1;

FIG. 15 is an enlarged side elevational view of the pilot control pin for the ballcock valve that is illustrated in the cross-sectional views of FIGS. 14 and 17;

FIG. 16 is another side elevational view of the pin seen in FIG. 15, but is taken looking at the pin from the right, or left, of the view seen in FIG. 15 to show the enlarged, diametric, flanges provided on the pin that serve to insure smooth operation during operation of the pilot valve; and FIG. 17 is a cross-sectional view, generally similar to the view seen in FIG. 14, but axially extended vertically to show more of the intake flow valve and showing the pilot control pin of the control valve means in a raised position, thereby permitting incoming flow of water through the intake valve to the flush tank;

DETAILED DESCRIPTION OF A PREFERRED EMBODIMENT

Figure 1:
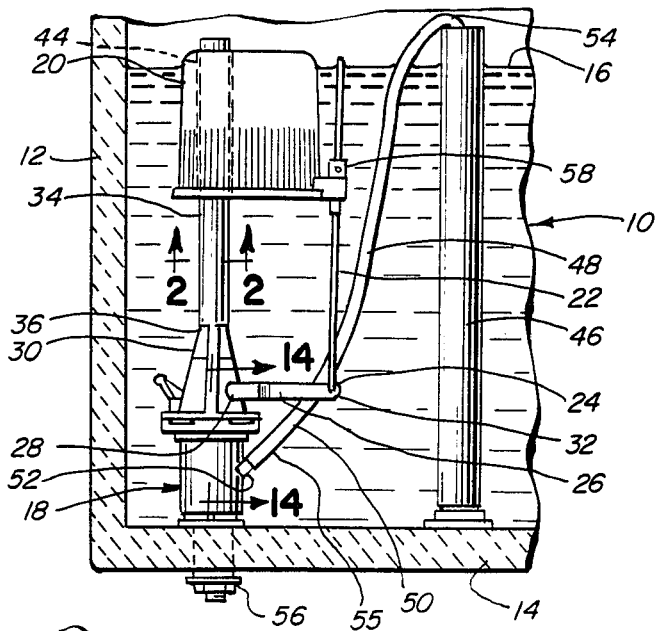
FIG. 1 illustrates generally a fragmentary portion of a flush tank for a flush toilet installation, showing our improved submerged ballcock mounted on the lower wall of the flush tank.

FIG. 1 is a sectioned partial elevation view of a flush tank of a toilet. Flush tank 10 forms a liquid containing reservoir having side walls, such as vertically extending side wall 12, and a bottom wall 14. A desired quantity of a liquid, generally water, is maintained at a predetermined level, such as a desired water level 16, within the tank by a water flow control valve assembly 18 opened and closed by vertical movement of a water level responsive float 20. Float 20 is operatively engaged with the valve assembly 18 by a linkage comprised of a float mounting and valve operator rod 22 which is pivotally engaged at its lower end 24 with a valve operator lever 26.

The valve operator lever 26 has a first end portion 28 pivotally and operatively engaged with an upper housing or casing and guide mast support member 30 of valve assembly 18. Lever 26 extends substantially axially outward from the valve assembly and has a second end portion 32 pivotally engaged with the lower end 24 of rod 22.

A float guide mast 34 is supportedly engaged with an upper portion 36 of housing member 30 and extends substantially vertically upwardly to slidingly receive and guide float 20 as the float ascends and decends with respect to the mast in response to changes in the water level 16.

Figure 2:
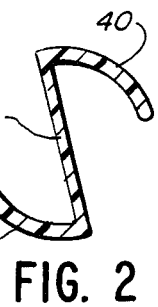
FIG. 2 is a cross-sectional view taken substantially along the section line 2—2 of FIG. 1 showing the cross-sectional shape and arrangement of the upright longitudinal walls of the mast of the ballcock, along which the float reciprocates as the water level rises and falls in the flush tank.

As shown in FIG. 2 in a cross section view, mast 34 is formed of two circular arc segments 38 and 40 joined together by a substantially diametrically positioned bridging member 42. Float 20 has a substantially circular elongated and vertically extending guide opening 44 formed in it and mast 34 is sized to be slidably or telescopingly received in opening 44, substantially as shown in FIG. 1. Having the mast formed as described provides a sturdy, substantially rigid member which efficiently guides vertical movement of float 20 with minimum friction, due to the decreased radially outward facing surfaces of the mast member, relative to its being formed as a complete circular member or tube.

A refill stand pipe 46 is provided within tank 10 and a refill tube, such as flexible tube 48, has a first end portion 50 connected to a refill nipple 52 formed on valve assembly 18 and a second end portion 54 positioned to direct water into the top of refill pipe 46. As is well known in the art, tube 48 diverts a portion of the water flowing through valve assembly 18 into refill pipe 46 to assure that a desired quantity of water is present in the tank to replace the tank water that is carried out by the momentum of water discharging from the tank upon flushing of the toilet.

An appropriate water flow inlet connection, such as connection member 56, is engaged with and extends through wall 14 of tank 10 to provide a pressurized source of water to valve assembly 18. Valve assembly 18 shuts off water flow through member 56 into tank 10 when the water level 16 is at the desired level, substantially as shown in FIG. 1, and allows water flow through member 56 into tank 10 when the water level is lowered and the float 20 consequently descends vertically downward along guide mast 34 to operatively open valve assembly 18 by the linkage comprised of rod 22 and lever 26. Float 20 is adjustably affixed to rod 22 by a resilient spring clip member 58 which causes the rod 22 to move vertically up or down together with the float. Clip member 58 can be readily manually manipulated and moved longitudinally along rod 22 to affix float 20 at a new fixed vertical position on the rod to raise or lower the desired water level required to have the float close valve assembly 18 to prevent additional water flow into the tank.

Figure 3:
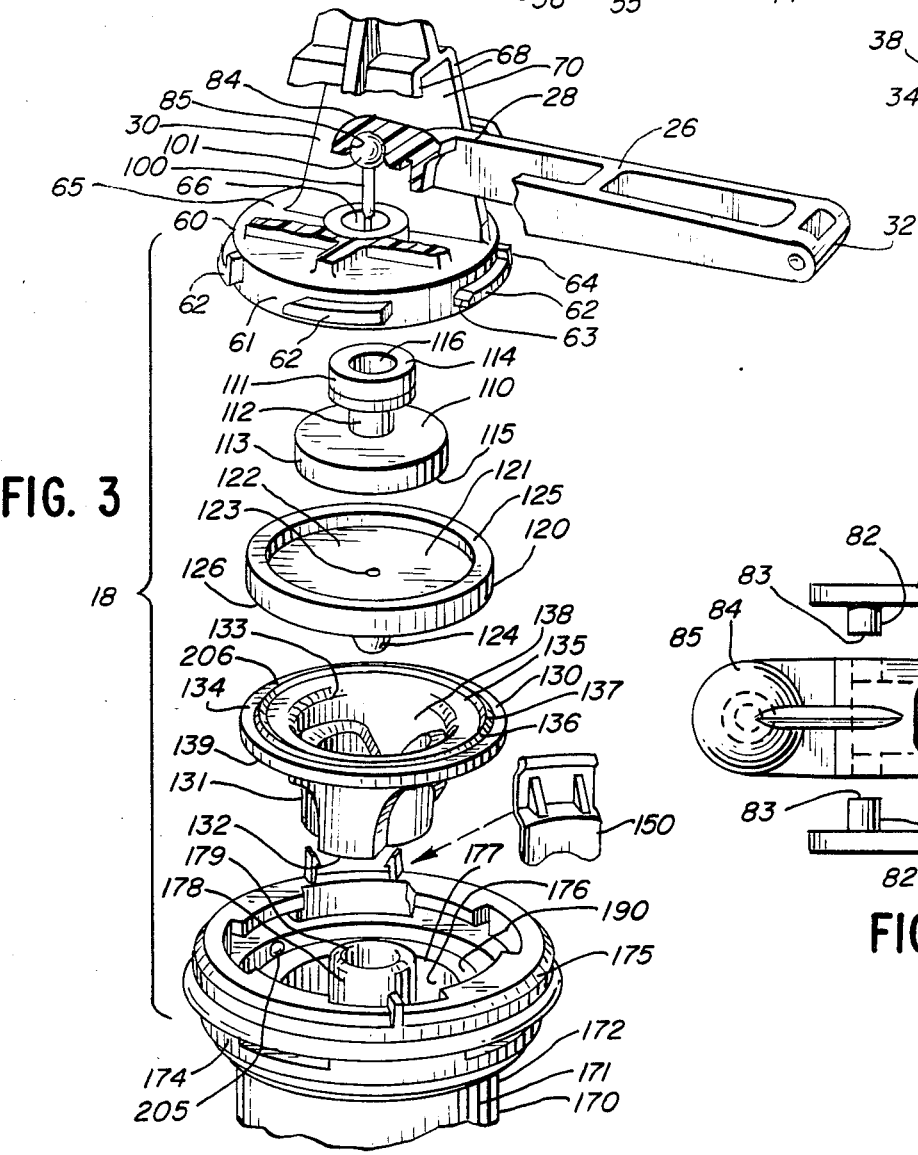
FIG. 3 is an enlarged, exploded, fragmentary view, showing in perspective a number of the operative elements of the ballcock's valving means.

FIG. 3 is an exploded perspective view of valve assembly 18, as indicated by the bracket, having portions cut away for clarity. Assembly 18 is comprised of the upper housing or casing and guide mast support 30, a pin means or pilot valve controlling pilot pin 100, a grommet means comprising an upper valving and pilot pin receiving member 110, a lower resilient valving member or resilient pilot pin receiving and valve control member 120, a removable water flow sound silencing member 130, an assembly locking member 150 and a lower housing or casing and water flow inlet and outlet member 170.

Pilot pin 100 is preferably formed of a corrosion resistant material, such as stainless steel, and each of the resilient members 110 and 120 are preferably formed of a molded rubber or rubber like material. The upper housing or casing member 30, lower housing or casing member 170, as well as the silencer 130 and locking member 150, are preferably formed of a substantially non-corrosive and rigid molded plastic material to provide economy of manufacture and extended durable service.

As shown in FIG. 3 and better shown in FIG. 5, upper casing member 30 is comprised of an annular wall 60 having radially outward facing peripheral surface 61. Affixed, preferably by being molded integral with surface 61, are a plurality of radially outward extending assembly lugs 62. Lugs 62 are substantially equally spaced around the periphery of wall 60 and are formed as segments of a helix. To facilitate coaction and assembly with mating parts on lower casing member 170 to form a bayonet type joint one or more of the lugs have a beveled leading edge 63 and a stop member 64 at a trailing edge.

A substantially disc shaped member or platform 65 is sealingly engaged or molded integral with an upper portion of annular wall 60. Substantially at the center of and extending through platform 65 is a circular grommet receiving opening 66 which is appropriately sized to sealingly receive and retain the first resilient seal member or grommet 110. A valve operator lever and float mast support means, such as a pair of support walls 68 are molded integral with a top surface of platform 65. Support walls 68 are laterally spaced from each other and extend upwardly from each of two substantially diametrically opposed sides of opening 66 to form a space or channel 70 sized for operatively receiving a portion of end portion 28 of valve operator lever 26. Support portion 36 extends upwardly from walls 68 above channel 70 to supportively engage float guide mast 34.

Affixed to or perferably, as shown in FIGS. 5 and 6, molded integral with a portion of each wall 68 is a pair of lever stud receiving and retaining formations 72. As shown in FIG. 5, each of the formations 72 is formed on a laterally outer facing portion of one of the walls 68 and are substantially aligned oppositely facing or back to back mirror images of each other.

As best shown in FIG. 6 showing, in enlarged detail, one of the retaining formations 72, each of the formations 72 is comprised of a stud guide means having a ramp means for guidingly and laterally outwardly moving an object, such as a stud, forced along the guide channel. The stud guide means has a substantially horizontally extending portion 73 and a second or substantially vertically extending portion 74. At an entrance end of channel portion 73 is a first laterally outward sloping ramp 75. Channel portion 74 also has a laterally outward sloping ramp 76 which, adjacent its lower end, is terminated by a substantially circular stud receiving opening 77 sized and positioned to receive and retain a portion of a stud having a substantially circular cylindrical shape. Formations 72 serve to provide mounting structure to enable pivotal movement of end portion 28 of valve operating lever 26 with respect to upper valve case 30.

Figure 4:
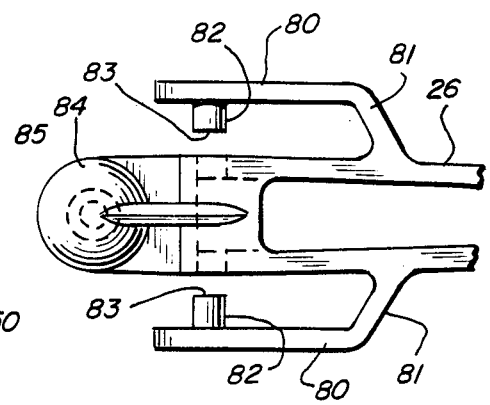
FIG. 4 is a fragmentary, top plan view of a portion of the pin controlling lever that is seen in perspective in the exploded view of FIG. 5.

As shown in a top plan view in FIG. 4 and in perspective in FIG. 5, end 28 of lever 26 is comprised of a pair of laterally spaced mounting arms 80. Each of the arms 80 is laterally spaced from and positioned substantially parallel to an opposite side body portion of lever 26 by a substantially rigid connective arm 81. A connection member, such as a stud 82, which is substantially circular in cross section has a first end affixed to a laterally inward facing portion of each of the arms 80 and extends laterally inward toward the main body portion of lever 26. Each stud 82 terminates in a substantially blunt terminal surface 83 spaced from the main body portion of lever 26. The studs are aligned or positioned co-axially with each other.

Positioned on the main body of lever 26 and extending longitudinally beyond the studs 82 is a pilot pin operative retaining means 84 having a downward opening substantially semispherical cavity 85 for receiving and retaining a substantially spherical head portion 101 of the pilot pin 100, as best shown in FIG. 3 and also shown in FIGS. 14 and 17. Head portion 101 is sized to be received in and retained by the cavity 85 in portion 84 of lever 26. Pin 100 is thus forced to move axially up and down with lever end portion 84 and head portion 101 of the pin and cavity 85 of the lever from a ball joint and are therefore capable of rotational or swivelling movement with respect to each other.

As shown in FIG. 3, the resilient member or grommet 110 has a first enlarged cylindrical section 111, a second reduced diameter cylindrical portion 112 and a third enlarged cylindrical section 113. Member 110 further has an upper terminal end portion 114 and a lower terminal end portion 115 and a pilot pin receiving bore 116 is formed coaxial with the longitudinal axis of member 110 and extends through member 110 from its upper to its lower terminal ends.

Upper cylindrical portion 111 of member 110 preferably has a tapered radially outward facing surface having its smallest diameter adjacent upper terminal end 114 for facilitating insertion of end 114 into a lower portion of bore 66 in member 65 and axial insertion of portion 111 through bore 66 to cause the member 110 to be assembled sealingly engaged with and retained within bore 66, substantially as shown in FIG. 14.

Assembly of pilot pin 100 and lever 26 to upper casing member 30 is achieved by placing an upper portion of substantially spherical head portion 101 of the pilot pin in contact with a lower open portion of cavity 85 in end portion 84 of lever 26 and forcing the two members toward each other. The lower open portion of cavity 85 is sized relative to head 101 and sufficiently resilient to enable head 101 to be forced into and trappingly maintained in the cavity for axial up and down movement with lever 26 and swivelling movement with respect to the lever.

Next the lower end portion 102, as best shown in FIGS. 14, 15, 16 and 17, is inserted into bore 116 of member 110 in a postion enabling it to be pushed axially downward into and through the bore. Then, referring to FIG. 5, the ends 83 (see FIG. 4) of studs 82 on mounting arms 80 of lever 26 are aligned with a respective entrance to a guide channel 73 on each of the retaining formations 72 of walls 68. The lever 26 is pushed axially toward the formations to force the studs along ramps 75 to cause the studs and arms to spread laterally outward. Next the lever and studs are forced downward in guide channel 74 along ramps 76 to cause further lateral spreading of the studs 82 and arms 80. Sufficient downward movement brings the studs into alignment with openings 77 whereby the resilience of the members 81 and 80 causes the studs to be moved laterally inward toward each other to be entrapped or retained within and rotatable with respect to the openings 77. This downward movement also causes pilot pin 100 to be moved axially downward to be positioned in bore 116 substantially as shown in FIG. 14 whereby pilot pin 100 is caused to move axially within the bore as lever 26 is caused to pivot about openings 77 when outer end 32 of the lever is caused to move up or down by movement of water level responsive float 20, as best shown in FIG. 1.

Referring to FIG. 3, the lower resilient valve control member 120 is comprised of a substantially circular disc-shaped portion 121 having a central, resiliently flexible diaphram portion 122. An axially extending bore 123 is centered in portion 122 and extends downwardly through a downwardly depending central enlargement 124 to provide fluid flow communication through member 120. Bore 123 is sized to axially receive lower end portion 102 of pilot pin 100. Portion 102 of the pin has a diameter sufficiently small compared to the diameter of bore 123 whereby fluid can flow through bore 123 in a controlled manner while portion 102 is positioned with the bore. At an outer peripheral portion of member 120 an enlarged substantially annular mounting and sealing flange 125 is provided which forms substantially a shallow depth cup. Flange 125 extends axially upward from member 122 and is sized to be sealingly received in an annular recess 88 formed in a lower surface of member 65, as shown in FIG. 14.

Silencer member 130, as shown in FIG. 3, is comprised of a substantially annular body portion 131 having a lower end portion 132 and an upper end portion 133. Affixed in sealingly engagement with and radially outwardly extending from end portion 133 is an annular mounting flange 134. As shown, flange 134 has an upward or axial outward facing surface 135. Concentrically positioned on flange surface 135 is an axially extending circular seal member 136 having an axially outermost terminal seal line or surface 137. When assembled, seal line 137 is forced into sealing engagement with a lower, axially downward facing surface 126 of second resilient member 120, substantially as shown in FIG. 14. As indicated in FIG. 3, silencer member 120 has an axially extending fluid flow and water inlet member receiving opening 138 extending through it from upper end 133 to lower end 132. Member 130 slips on or over the water inlet member and is readily removable.

Lower housing member 170 of valve assembly 18, as partially shown in perspective in FIG. 3, and more completely shown in longitudinal cross section in FIG. 17, is comprised of a substantially cylindrical outer member 171 having an upper end portion 172 and a lower end portion 173 (shown in FIG. 17 only). Upper end portion 172 of outer member 171 is provided with a radially outwardly extending shoulder 174 having an axially upwardly extending substantially annular connection sleeve 175.

Extending axially within member 170 is an annular chamber 176 having an upper open end 177. Concentric with, or centered within, and extending through chamber 176 is an upstanding fluid flow conduit 178 having an upper terminus or terminal end portion which comprises an annular sealing surface 179 as best shown in FIGS. 14 and 17. Sealing surface 179 is preferably rounded in cross section, substantially as shown.

As best shown in perspective in FIG. 5, in which the intervening members 110, 120 and 130 of FIG. 3 have been omitted for clarity, connective sleeve 175 of lower housing member 170 has an upper inner peripheral portion comprised of a plurality of radially inward extending locking or engagement lugs 180, which are formed as equally spaced circular arc segments. Axially beneath each of the lugs 180 is an assembly lug receiving space 181 for receiving one of the assembly lugs 62 of upper housing member 30. An arcuate space 182 is provided between each of the engagement lugs 180. Each of the spaces 182 is sized to axially receive one of the assembly lugs 62 and member 30.

Thus with the components 110, 120 and 130 positioned between housing members 30 and 170, substantially as shown in FIG. 3 in the exploded perspective view and better shown in FIGS. 14 and 17 as a cross section of the completed assembly, the upper and lower housing members are assembled by axial alignment with each of the assembly lugs 62 of the upper casing with a space 182 of connective sleeve 175. The members are then moved axially together until each lug 62 is completely received within a space 182. One of the members 30 and 170 is then rotated about its longitudinal axis with respect to the other of the members in an appropriate direction for causing the leading or beveled edge 63 of each assembly lug 62 to be rotatingly received beneath an engagement lug 180 in a recess 181. The upper and lower casing members are preferably rotated until one of the stop members 64 on a trailing edge of a lug 62 contacts a leading edge, such as an edge 183 of FIG. 5, of an engagement lug 180. In this bayonet-type fitting manner each of the lugs 62 of the upper housing member 130 are lockingly engaged in a recess 181 beneath an engagement lug 180 of lower housing member 170 to sealingly, due the presence and coaction of the members 120 and 130 as best shown in FIGS. 14 and 17, form valve assembly 18.

As best shown in FIGS. 5, 6 and 7 a locking means, such as insertable locking member 150, is preferably provided to coact with a locking slot 160 formed in member 30 and a pair of lock tabs 161 mounted on sleeve 175 of lower casing member 170 to guard against inadvertent unlocking or disassembly rotation of members 30 and 170.

Locking member 150 is formed of a circular arc segment lock tab 151, a graspable portion 152, to facilitate manual insertion and removal, and a pair of arcuately spaced lock shoulders 153.

Formed in the peripheral outer portion 61 of upper casing 30, as best shown in FIGS. 7 and 8, is an axially extending slot 160 sized to insertably axially receive arcuate lock tab 151 of locking member 150. As best shown in FIG. 7, tab 151 is interferingly or abuttingly engaged with each of two slot ends 162 of slot 160.

The pair of lock tabs 161 are affixed to sleeve 175 of member 170 and extend axially upward on each of two sides of member 150 whereby relative rotation between members 30 and 170 is prevented. Members 161 are resiliently bendable outwardly away from the sides of member 150 and self-returnable to their normal positions substantially as shown in FIGS. 5 and 7.

A pair of opposed lock shoulders 166 are formed on the inner or facing walls of the members 161. As best shown on one of the members 161 in FIG. 5, each of the shoulders 166 have a downwardly converging ramp or slope surface 167 which terminates in a substantially horizontal topped recess whereby as the tab 151 of member 150 is inserted in slot 160 and pushed downward the sides of member 150 contact the converging ramps 167 and cause the members 161 to be biased away from each other. However, upon downward axial movement of member 151 into complete engagement with slot 160 the arcuately spaced lock shoulders 153 of member 150 become positioned axially below and out of contact with the ramps 167. Consequently, the members 161 return inward foward each other to bring the top portion of the horizontal topped recess over and into interfering engagement with the shoulders 153 of member 150. Therefore, locking member 150 cannot be withdrawn from between members 161 until they are spread away from each other.

Positioned radially inward from the peripheral inner portion of connection sleeve 175 and axially below resesses 181 of lower casing member 170 is an axially upward facing annular surface or shoulder 190 which serves as a support seat for silencer member 130. Shoulder 190 is formed substantially concentric with and radially outwardly spaced from pressurized water inflow conduit 178.

Referring now to FIGS. 9, 10, 11, 12 and 13, the radially outward extending mounting flange 134 of silencer member 130 has an axially downward facing or lower surface portion 139 adapted to seat on and be supported by annular shoulder 190 of lower casing member 170. Shoulder 190 thus serves to position or locate and maintain silencer member 130 in a desired position with respect to annular chamber 176 and water inflow conduit 178.

As best shown in FIGS. 9 and 12, silencer member 130 has a firt pair of radially inward facing wall surfaces 140 having a diameter slightly larger than the external diameter of water inlet conduit 178 whereby the flow of water between the external surface of conduit 178 and the wall surfaces 140 is effectively prevented. As best shown in FIG. 11 in a cross-sectional elevation view, surfaces 140 are formed having substantially inverted parabolic upper shoulder water flow directing surfaces 142 which downwardly converge and are affixed to and curved around the wall of an arcuate segment of the annular body 131 of member 130. A pair of substantially diametrically opposed water flow channels 143 are formed between the lower terminations of shoulder surfaces 142.

Member 130 also has a second pair of radially inward facing wall surfaces 141 having a diameter greater than the external diameter of the inlet conduit 178 for forming a quieting passage. Wall surfaces 141 are spaced radially outwardly from the external surface of water supply conduit 178. Therefore, as best shown in FIG. 17, pressurized water from the interior of supply conduit 178 flows radially outwardly, when the valve is open, over the smoothly curved upper annular terminal seal surface 179 of conduit 178 and downwardly, confined between the external wall of member 178 and the internal wall surfaces 141 of silencer member 130, and is smoothly directed by the downwardly converging parabolic shoulders 142 to flow downwardly through the flow channels 143 laminarily along the external surface of the lower external surface portion of conduit 178 in annular chamber 176.

As shown in FIG. 13 and 17, at a lower portion of the annular chamber 176 a pair of substantially diametrically opposed water flow outlets 200 are formed in the lower portions of outer wall 171 of member 170.

Silencer member 130 is preferably positioned within chamber 176 whereby each of the water flow channels 143 formed in the silencer are in substantial longitudinal alignment above a water flow outlet 200 to promote water flow from a channel 143 downwardly along the external wall of member 178 and radially outwardly through an opening 200 into the flush tank or reservoir.

As best shown in FIG. 3, a silencer orienting means, such as a protrusion or locating nib 205, is preferably formed extending radially inwardly from above silencer seating and support surface 190 of member 170. A nib receiving means, such as notch 206 is formed on the mounting flange 134 of member 130. During assembly, the protrusion 205 is received by the notch 206 to thereby assure that the valve assembly 18 can only be assembled with the flow channels 143 of member 130 positioned in longitudinal alignment above the water flow outlet channels 200, substantially as shown in FIG. 13 and 17.

FIG. 15 is an enlarged elevation view of the pilot pin 100 which coacts with first and second resilient members 110 and 120 and the water level responsive float 20 of FIG. 1, via the linkage of rod 22 and lever 26 to control operation of the valve. FIG. 16 shows the pilot pin shown in FIG. 15 rotated 90 degrees about its longitudinal axis.

Positioned between the upper spherical, lever engaging head portion 101 and the lower portion 102 is a reduced diameter portion 103, a transition portion 104 having throttling means 105 and an enlarged upper portion 106. Portion 102 is sized to fit loosely in bore 123 of member 120 to enable liquid to flow through the bore when the portion 102 of pin 100 is in it.

Portion 103 is positioned on the pin to axially be moved into and out of a lower restrictive portion 117 (shown in FIGS. 14 and 17) of bore 116 in resilient valve control member 110. When only portion 103 is in portion 117 it, due to its reduced diameter relative to the bore, allows a substantial fluid flow through the bore from a valve control pressure chamber 220 formed between the first and second resilient members 110 and 120, respectively, into the flush tank or reservoir.

Larger diameter portion 106 is sized with respect to bore portion 117 of bore 116 to seal the bore and prevent liquid flow through it when it is axially inserted into the bore portion 117 by downward movement of end portion 84 of lever 26. An upper substantially inverted cone-shaped bore portion 118 of bore 116 is sufficiently large in diameter relative to the diameter of portion 106 of pin 100 to enable liquid to flow through portion 118 with portion 106 positioned within it. The downwardly converging tapered wall of bore portion 118 has substantially the same taper as the downwardly converging wall of transition portion 104 of the pin 100. Portion 104 serves as a gradual transition member to guide portion 106 into bore 117 as it is moved axial downward by appropriate movement of float 20 and lever 26.

To prevent abrupt commencement and cessation of flow through bore portion 117 as the pin is moved axially to either move portion 106 into or out of portion 117 a throttling means to control the abruptness of the transition from the open to flow to closed to flow mode is provided.

The throttling means is comprised of a pair of diametrically opposed radially outwardly extending projections 105 which are affixed to and move axially in and out of bore portion 117 with the transition portion 104 to serve to retard the abruptness of going from opened to closed or closed to open.

Referring to FIGS. 14 and 17, operation of the valve is described below.

FIG. 14 shows the valve in the closed mode in which lever 26 has forced pin 100 axially downward to place portion 106 into sealing engagement with bore portion 117 of member 116 due to float 20 raising end 32 (shown in FIG. 1) of lever 26.

Thus, pressurized water from the interior of conduit 178 has flowed through bore 123 of second resilient member 120 into pressure chamber 220 formed between members 110 and 120. Due to the far greater surface area of the upper surface of member 120, which forms the lower surface of pressure chamber 220, compared to the lower surface of member 120 which is positioned to sealingly engage sealing annulus 179 of member 178 the centally movable portion 122 of member is forced downward by this pressure differential and maintained in that position to seal annulus 179 and thus prevent water flow from member 178.

However, due to a decrease in the water level 16 in the reservoir or tank of FIG. 1, such as when a toilet tank is flushed, the float will move downward on mast 34 to cause end 32 of lever 26 to be lowered, thus raising end 28 of the lever and causing pin 100 to be drawn axially upward to withdraw portion 106 out of sealing engagement with bore portion 117. When portion 106 is withdrawn from portion 117 the pressure in the pressure chamber 220 is relieved as water can flow through the bore 117 into the reservoir. Consequently, the pressure imposed on the lower surface of member 120 sealing annulus 179 is sufficient to unsealingly move the centrally movable portion of member 120 upward and water flows upward through conduit 178, radially outward over the smooth, rounded upper terminal annular end of member 178, which forms the sealing annulus 179, and convergingly downwardly guided by the laminar flow promoting parabolic profile shoulder surfaces 142 to exit the silencer member 130 through flow channels 143. The water continues to flow downwardly and radially outwardly through the outlets 200, each substantially longitudinally aligned with a flow channel 143, into the tank.

Eventually the water level in the tank will rise to a desired level, such as shown for level 16 in FIG. 1, and the float 20 will rise with it while gradually pivoting lever 26 about studs 82 to cause the lever to again axially force portion 106 of pin 100 into sealing engagement with bore portion 117, whereby the structure of the valve will again be substantially as shown in FIG. 14 and ready for the next flush cycle.

What is claimed is:

1. In a ballcock valve formed by connected upper and lower housing members that include therein separate upper and lower resilient valving members, the upper housing member having a central axial aperture and the lower housing member including an inflow tube for introducing water into the ballcock valve through an upper annular terminus which provides valve seat means, the improvement comprising, in combination:

a removable silencer having downward directed nozzle means positioned annularly around the inflow tube;

the upper resilient valving member being a grommet means with an interior, central, through axial bore for insertion into the upper housing member aperture;

the lower resilient valving member including a shallow depth cup with an annular transverse diaphragm means having a central bore, and an upward projecting peripheral flange, all spaced away from said upper resilient valving member, said lower resilient valving member being located between said upper and lower housing members and being directly supported by said silencer;

the upper housing member providing retaining means for cooperating with said silencer to hold said flange substantially rigidly in sealed relationship to the bottom of the upper housing member to provide, with said grommet means inserted, a pressure chamber between the upper and lower valve members, said pressure chamber communicating outwardly only through the interior bore of said grommet means and through said central bore of said lower valving member; and pin means inserted through said grommet means axial bore and into said central bore of said lower valving member for controlling the pressure in the pressure chamber by sliding axially upward and downward; and the pressure in said pressure chamber positioning said diaphragm with respect to said valve seat means to control the flow of water out of the inflow tube.

2. A ballcock valve according to claim 1 wherein said grommet means comprises an axially elongated plug surrounding said central axial bore, said bore passes through a grommet middle section and an upper and lower section, and said bore has an upper portion having the shape of a downwardly converging cone with a narrow lower opening.

3. A ballcock valve according to claim 2 including a pin having first end portion sized to pass freely through said grommet means bore, and a sealing portion having diameter sufficiently large for sealing said narrow lower opening of said grommet means bore, said pin being insertable, first portion first, into said grommet means bore from above to open end to close said passage by respective up and down axial motion of said pin, and the lower end of said pin having throttling means to provide shock-dampening bleed.

4. In a submerged ballcock valve formed by connected upper and lower housing members, the upper housing member having a central axial opening for receiving a metering pin controlling operation of the valve by axial reciprocating motion, and the lower housing member including an inflow tube for introducing water into the ballcock valve through an upper annular terminus, the improvement comprising, in combination:

a vertically disposed mast connected to the upper housing member by a pair of walls positioned on each of two sides of said central axial opening, said walls having a pair of laterally aligned circular openings, said openings being disposed on a common axis and opening outwardly;

a float guided slidingly on said mast;

a metering pin with a spherical head fitting into the axial opening from above;

lever means being connected to the upper housing member and comprising:

(1) a substantially straight body portion having a semispherical cavity disposed at a first end, a lower portion of said cavity defining an opening, (2) a pair of opposed resilient mounting arms laterally spaced from each other and mounted on said straight body portion, said cavity being disposed between said mounting arms and being integrally connected thereto, (3) a pair of circular cylindrical studs attached to, and projecting inwardly from, said respective resilient mounting arms, said studs being positioned on a common pivot axis substantially perpendicular to said arms, and said studs being adapted and sized to snap-fit into said respective circular holes to provide a pivot for said lever, said pivot axis being positioned and oriented to provide a ball-and-socket coupling between said cavity and said spherical head; and linkage means operatively linking said float to a second end of said lever to rotate said lever about said pivot in response to vertical motion of said float to cause axial motion of said metering pin swivellingly mounted to said lever by said ball-andsocket connection.

5. A ballcock valve according to claim 1 wherein said upper and lower members are connected by a bayonet-type fitting.

6. A ballcock valve according to claim 5 wherein said bayonet-type fitting is provided with means for defining a unique relative orientation for assembling said upper and lower housings.

7. A ballcock valve according to claim 5 wherein said bayonet-type assembly includes an insertable locking member.

8. A ballcock valve according to claim 4 having in addition removable wall means telescopically fitted over the inflow tube to define a quieting passage having an annular intake opening at an upstream end and a plurality of downstream directed nozzles at its downstream end, said quieting passage being radially terminated inwardly by the inflow tube and outwardly by interior surface portions of said wall means.

9. A ballcock valve according to claim 4 wherein said cavity, said arms, and said studs are arranged to restrict said metering pin to axial movement.

10. A valve assembly having a liquid flow control valve of the pilot type for controlling the level of a liquid in a reservoir, said valve having a rigid casing having an interior substantially annular valve chamber and a liquid supply conduit having an upward facing annular terminal end portion in said valve chamber, said assembly comprising:

a substantially annular removable silencer member surrounding said liquid supply conduit adjacent said annular terminal end portion, said silencer member having a pair of substantially diametrically opposed downwardly converging liquid flow channels and an upwardly extending circular seal means substantially concentric with said annular terminal end portion of said supply conduit;

a resilient valving member having a centrally movable diaphragm portion and an annular peripheral engagement portion, said valving member being sealingly confined within said valve chamber and having a lower surface portion sealingly and supportingly engaged with said circular seal means of said silencer member, said valving member having an axially extending central bore having a substantially circular cross section of a substantially constant diameter along its longitudinal length;

a substantially immovable resilient grommet axially spaced from and positioned axially above and substantially concentric with said valving member, said grommet having a central, axially extending bore having a lower portion proximal said valving member and an upper portion distal said valving member, said bore in said valving member and said bore in said grommet being axially aligned with each other;

a portion of said casing being sealingly engaged with each said valving member and said grommet and interposed between said valving member and said grommet for forming a valve actuating pressure chamber between said valving member and said grommet;

said centrally movable diaphram portion of said valving member having a first lower surface portion sealingly engageable with said annular terminal end portion of said liquid supply conduit and a second upper surface forming a lower portion of said pressure chamber, said upper surface having a greater surface area than the surface area of said lower surface;

said bore of said valving member extending between said first surface and said second surface for placing said liquid supply conduit in fluid flow communication with said pressure chamber;

said bore of said grommet placing said pressure chamber in fluid flow communication with said reservoir; and an axially movable metering pin movable in response to the level of liquid in said reservoir, said metering pin having a lower portion positioned within said bore of said valving member and a middle and upper portion operatively positionable within said bore of said grommet, said lower portion of said metering pin being sized with respect to said bore in said valving member for allowing limited liquid flow through said bore from said supply conduit to said pressure chamber, said upper portion of said metering pin being sized for sealingly blocking said bore in said grommet and said middle portion of said metering pin being sized for allowing liquid flow through said bore of said grommet whereby when said meter pin is axially positioned for having said upper portion in said bore of said grommet said valve actuating pressure chamber receives liquid flow through said bore of said valving member for sealingly engaging said first lower surface of said valving member with said annular terminal end portion of said liquid supply conduit for preventing liquid from flowing from said supply conduit to said reservoir and when said middle portion of said metering pin is positioned within said bore of said grommet, liquid is able to flow from said valve actuating pressure chamber into said reservoir for relieving pressure in said chamber for causing said lower surface of said valving member to be unsealingly forced away from the annular terminal end portion of said liquid supply conduit for allowing liquid to flow from said supply conduit into said reservoir.

11. The invention defined in claim 10 together with a throttling means affixed to said metering pin between said upper portion and said middle portion for causing said metering pin to relatively gradually block said bore in said grommet for aiding in preventing said valving seal member from being moved to an unsealed position with respect to said supply conduit by water shock as said upper portion of said pin is axially moved into blocking engagement in said bore of said grommet.

12. The invention defined in claim 11 in which said throttling means includes a downwardly converging truncated cone shaped transition portion of said pin, said transition portion having a first end having a first diameter axially engaged with an end of said upper portion of said metering pin and a second end having a second diameter engaged with said middle portion of said meter pin, said first diameter being larger than said second diameter and a pair of projections affixed to each of two diametrically opposed sides of said transition portion and extending radially outwardly for forming a gradually closing liquid flow passage on each side of said transition portion as said pin is moved axially into said bore of said grommet for blockingly positioning said upper portion of said metering pin within said bore.

* * * * *